United States Patent [19]

McFatter

[11] 4,121,747
[45] Oct. 24, 1978

[54] STORAGE TANK CONSTRUCTION PROCEDURES

[75] Inventor: Myron L. McFatter, Texas City, Tex.

[73] Assignee: Anchortank, Inc., Seabrook, Tex.

[21] Appl. No.: 656,252

[22] Filed: Feb. 9, 1976

[51] Int. Cl.² .................... B23K 31/02; B23K 37/04; E04H 7/30

[52] U.S. Cl. ................................. 228/17.7; 228/46; 228/47; 228/173 D; 228/184; 29/429; 193/35 C

[58] Field of Search .................... 228/46, 17.7, 47, 50, 228/145, 173 D, 184; 29/429; 72/50; 193/35 R, 35 C

[56] References Cited

U.S. PATENT DOCUMENTS

| 1,942,304 | 1/1934 | Mylting | 228/125 X |
| 3,241,736 | 3/1966 | Nesmith | 228/46 X |
| 3,380,147 | 4/1968 | McDonald | 228/145 |

FOREIGN PATENT DOCUMENTS

1,684,913  4/1971  Fed. Rep. of Germany.

Primary Examiner—James L. Jones, Jr.
Assistant Examiner—K J Ramsey
Attorney, Agent, or Firm—Copper, Dunham, Clark, Griffin & Moran

[57] ABSTRACT

Large diameter storage tanks are constructed from strip metal wound in a helical path in which the tank is built upwardly. The strip is fed to a support assembly arranged circularly on a base, and the upper edge of the strip that is fed to the support assembly is aligned with the lower edge of the helical turn immediately thereabove so that the edges are spaced apart in a vertical plane from each other and then butt welded together. The strip is vertically adjusted to maintain a predetermined spacing of adjacent helical turns of the strip in the area of the welding thereof. The support structure in the area of the welding includes parts positioned on opposite sides of the strips, the inside one of which may be collapsed to permit removal of the assembly following completion of the tank. Top structures accommodating the helically wound strip are utilized.

7 Claims, 22 Drawing Figures

STORAGE TANK CONSTRUCTION PROCEDURES

BACKGROUND AND BRIEF DESCRIPTION OF THE INVENTION

This invention relates to the production of storage tanks. It is particularly directed to the production of large diameter storage tanks from strip metal.

It is known to produce large diameter storage tanks from strip metal in which the tanks are built upwardly by the feeding of the strip metal to a support assembly arranged circularly on a base and which supports the strip in a helical path. The McDonald U.S. Pat. No. 3,380,147 which issued 30 Apr. 1968 is an example of one such method of producing a storage tank. As disclosed in that patent, one edge of the strip metal is bent and overlapped with the adjacent helical turn which is not bent. Two separate and distinct welds are then completed to join the adjacent helical turns together.

One aspect of the present invention involves the production of a storage tank without edge bending of the steel in any manner. Adjacent edges of helical turns are butt welded together in a single welding operation to join adjacent helical turns of the tank together.

The present invention also involves techniques for handling the steel as the tank is made. In particular, the strip is vertically adjusted to provide for appropriate orientation during the construction process and to ensure a proper spacing of adjacent turns of the strip for welding purposes. A unique yoke assembly may be employed bearing against both the upper and lower edges of the strip metal as it is fed to the support assembly, thus providing for vertical adjustment of the strip both upwardly and downwardly. Spacing of the strip in the area of the welding operation itself may be achieved by spacing devices, such as a spacing disk or wedge-shaped spacer which spaces apart the adjacent helical turns by the predetermined amount necessary for proper welding. The welding itself may be by hand operation, or automatic. A chill roller may be employed on the opposite side of the strip from the welding head to provide a back-up for weld bead formation purposes, and may provide for the addition of a back-up strip to be added to reinforce the weld.

The aligning of the adjacent helical turns of the strip metal as well as the welding may be carried out through use of a support structure which is mounted on the base and which includes two parts, one on the outside of the tank which is being built and the other on the inside. The inside part is collapsible, so that the support structure may be easily withdrawn following the completion of the building of the tank.

The support assembly for the entire tank is advantageously constructed of groups of rollers that are arranged circularly about the base. Each roller group may include support rollers that a support the lower edge of the strip and side support rollers positioned against the inside and outside surfaces of the strip. These support rollers may be mounted on a support bracket which is pivotable about horizontal and vertical axes to provide for varying degrees of orientation of the rollers to accomodate varying pitches of the strip steel and diameters of tanks.

Various construction procedures for the fabrication of tank tops as well as bases for tops and bottoms of tanks are disclosed.

The invention will be more completely understood by reference to the following detailed description, taken in conjunction with the drawings.

DETAILED DESCRIPTION

Figures 1, 2:
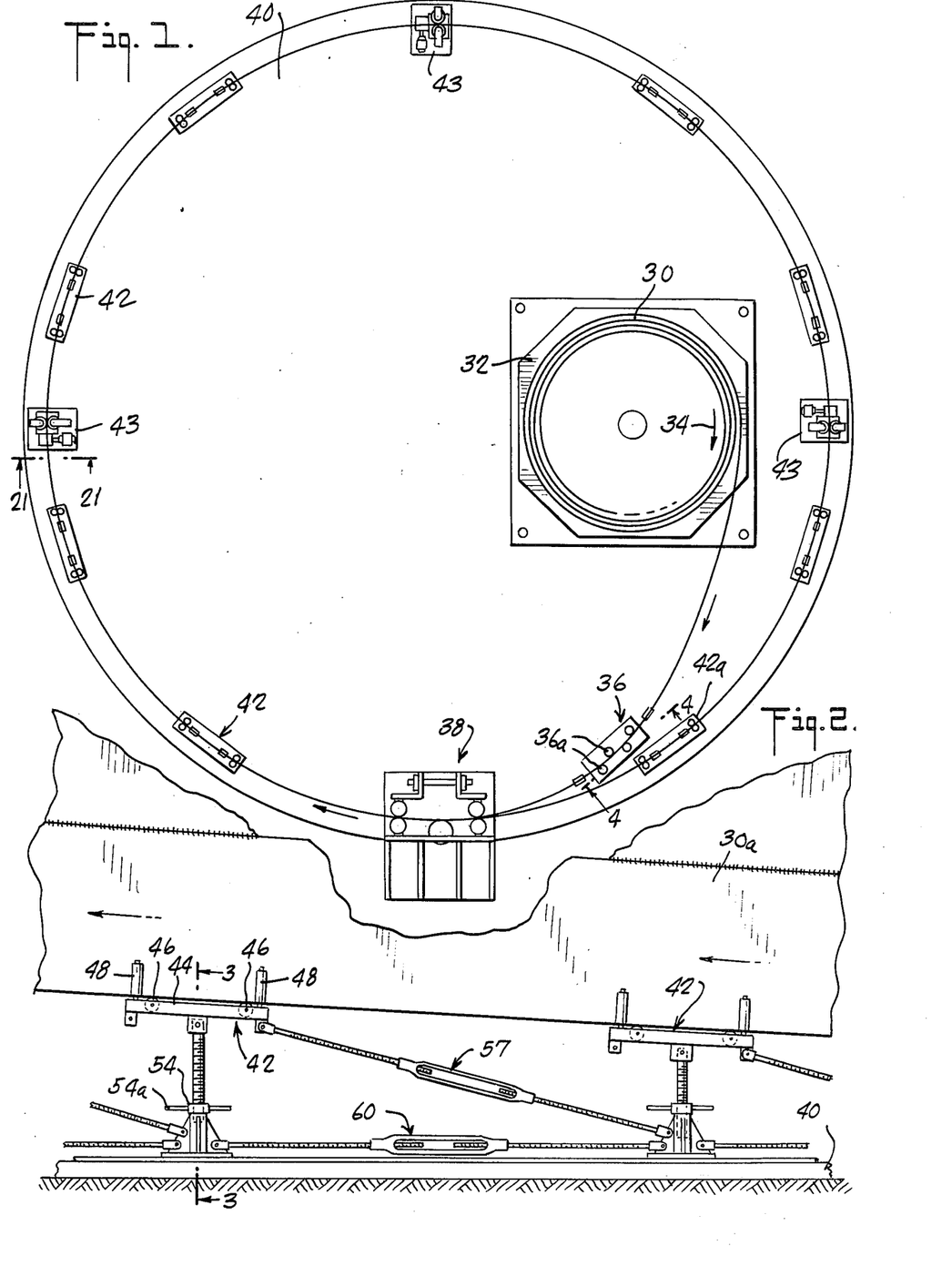
FIG. 1 is a view looking downwardly upon a tank construction facility in accordance with the invention.
FIG. 2 is a side view, to an enlarged scale, of part of the facility shown in FIG. 1.

Referring to FIG. 1, coiled strip metal 30, typically strip steel, is mounted on a support platform 32 which is free to rotate in the direction of arrow 34. The free end of the strip is led through a bending roller assembly 36 which is shown in more detail in FIG. 4 and passes thence through an assembly 38 which is shown in more detail in FIG. 7. The strip metal then passes onto a support assembly arranged circularly on a base 40. The support assembly comprises groups 42 of rollers spaced preferably equidistantly (although not necessarily) in circular fashion about the base 40. The support roller structure 42 is shown in more detail in FIG. 2, and is included for the purpose of supporting the strip metal at a predetermined pitch or incline from the horizontal so that the strip may follow a helical path in the building of a storage tank. The free end of the strip passes from the last one of the support roller assemblies designated 42a in FIG. 1 and again through the assembly 38. Within the assembly 38, the upper edge of the strip that is fed to the support assembly from the bending assembly 36 is aligned with the lower edge of the helical turn immediately thereabove (that portion of the strip coming from the last support roller assembly 42a). These strip edges are spaced apart in a vertical plane from each other and butt welded together as will be described in more detail below.

Figures 3, 4:
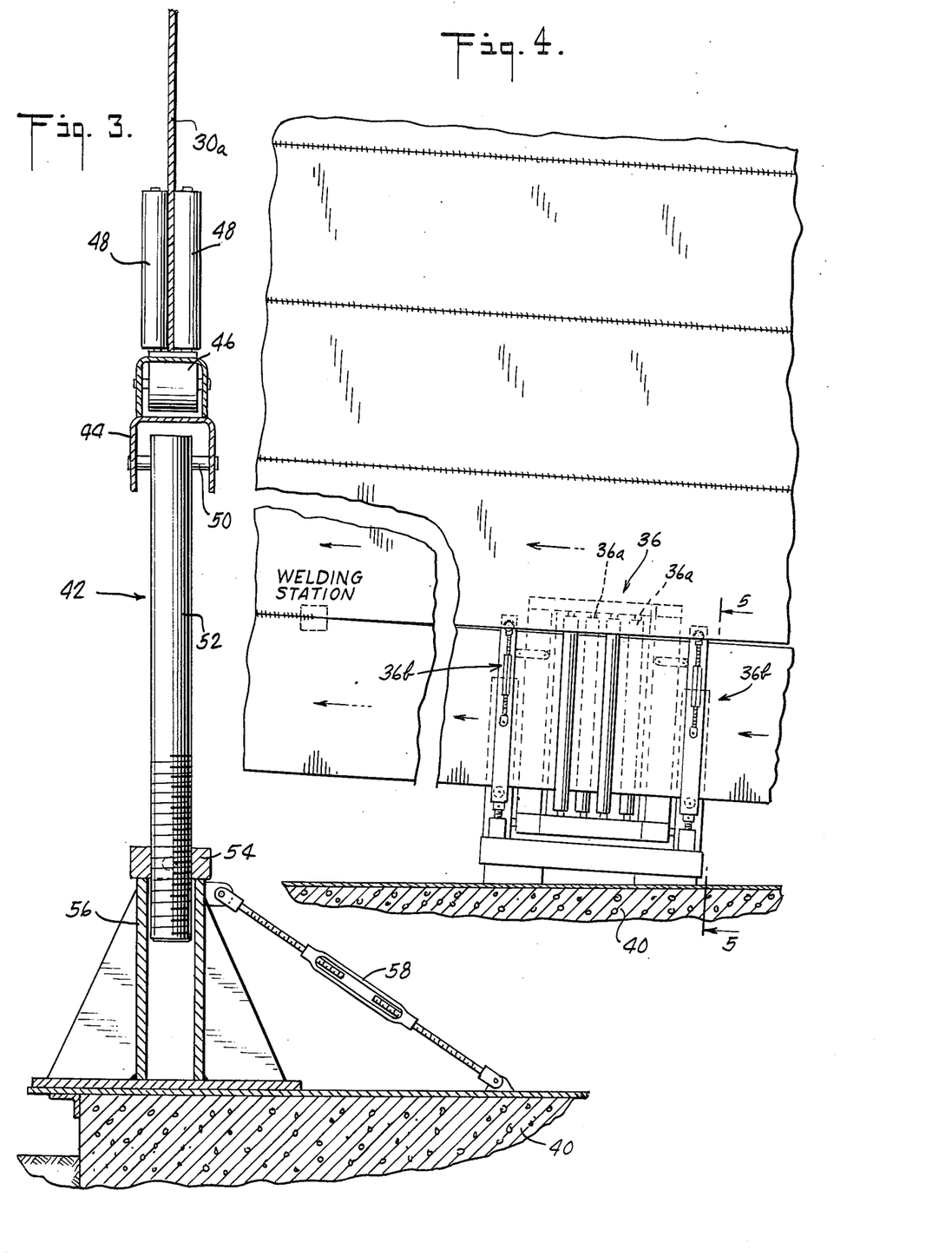
FIGS. 3, 4, 5 and 6 are sectional views, to enlarged scales, taken respectively along sections 3—3, 4—4, 5—5 and 6—6 respectively in FIGS. 2, 1, 4 and 5.

Referring to FIG. 2, two adjacent ones of the support assemblies for supporting the strip about the base are shown. Referring to FIGS. 2 and 3 together, a roller support bracket 44 carries support rollers 46 which support the lower edge of the strip, designated 30a in FIGS. 2 and 3. The support bracket 44 also carries side support rollers 48 positioned against the inside and outside surfaces of the strip 30a. These support rollers provide appropriate support of the strip 30a.

The support bracket 44 is pivotally mounted about a horizontal axis provided by pin 50 which passes through a threaded rod 52. That rod is threaded through a cap 54 which rotates freely upon base structure 56. The support bracket 44 is thus essentially pivotable about a vertical axis (the axis of the threaded rod 52). As shown in FIG. 2, the threaded cap 54 includes a handle 54a secured thereto to permit the selective turning of the cap 54 and the consequent raising and lowering of the threaded rod 52. Thus the support bracket 44 is vertically adjustable to vary the height of that bracket above the base 40 of the entire tank building facility. When the bracket 44 and the cap 54 are pivoted together, no height change is effected; however, the orientation of the bracket 44 about the vertical axis referred to above is changed. In this fashion the roller support bracket 44 may be shifted in its orientation about the vertical axis to accomodate tanks of varying diameters (the roller support structure 42 would obviously be moved inwardly or outwardly on the base 40 in the building of tanks of different diameters).

The horizontal orientation of the roller support bracket 44 is fixed by virtue of turnbuckle assembly 57 joined to the rearward end of the bracket 44 as well as essentially to the base 40. As the rearward end of the support bracket 44 is lowered or raised, the inclination of that support bracket with respect to the horizontal is changed, thereby to accomodate varying pitches of strip metal in the building of tanks of different diameters or different widths of strip metal. The adjustable turnbuckle arrangement 57 is adjusted for the particular orientation of the roller support bracket 44. In this regard, it will be noted that the roller support bracket automatically assumes the appropriate orientations for a particular pitch of strip metal by the pivoting of the bracket about the pivot pin 50.

The support structure 56 shown in FIG. 3 that supports the threaded rod 52 may be anchored to the base 40 in any suitable fashion. That structure may be bolted or welded to the base, if desired, and a supporting turnbuckle assembly 58 may be utilized to prevent tipping of the support structure 56. It will be noted that turnbuckle assemblies 60 shown in FIG. 2 are also employed joining together adjacent ones of the roller support structures 42 along the base structure 40 for the purpose of added stability of the entire system.

Figure 21:
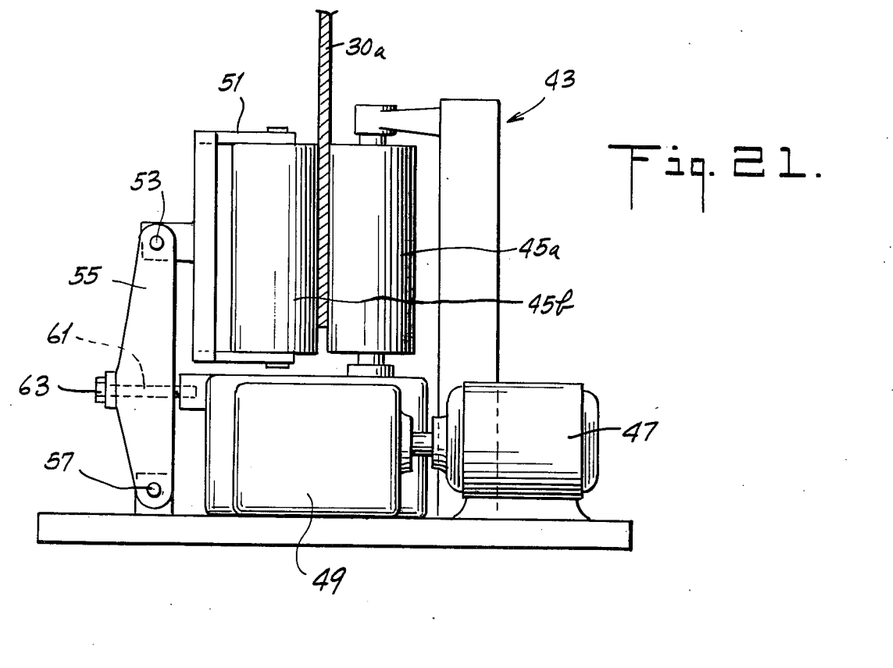
FIG. 21 illustrates a strip driving mechanism.

Interspersed among the support structures 42 are strip drive mechanisms 43. There may be three of such strip drive mechanisms which, together with the strip driving mechanism forming part of the assembly 38, are also spaced about 90° about the circumference of the tank building facility. A presently preferred form of drive assembly 43 is shown in FIG. 21. Strip 30a of metal is shown pinched between rollers 45a and 45b. The roller 45a may be driven by a motor 47 through a conventional gear box 49. The other roller 45b may advantageously be non-driven, supported for rotation by a yoke 51 which is pivotally coupled about axis 53 to a support arm 55. The support arm 55 is in turn pivotally coupled about axis 57 to base member 59. Pivotally mounting the yoke 51 permits appropriate orientation change of the roller 45b to accomodate varying orientations of the strip 30a. A stud 61 and nut 63 retain the support arm 55 in place. Tightning the nut 63 causes the roller 45b to bear against the strip 30a with increased pressure, which is adjusted for suitable driving of the strip. If the nut 63 is removed entirely, the arm 55 may be pivotted about the axis 57 to swing the entire assembly of yoke 51 and roller 45b about the axis 57 into a non-operative position (approximately 90° from the operative position shown in FIG. 21). By so pivoting the yoke 51 to a non-operative position, the entire assembly 43 may be removed easily following the building of a tank from beneath the lower edge of the strip 30a.

Figures 5, 6:
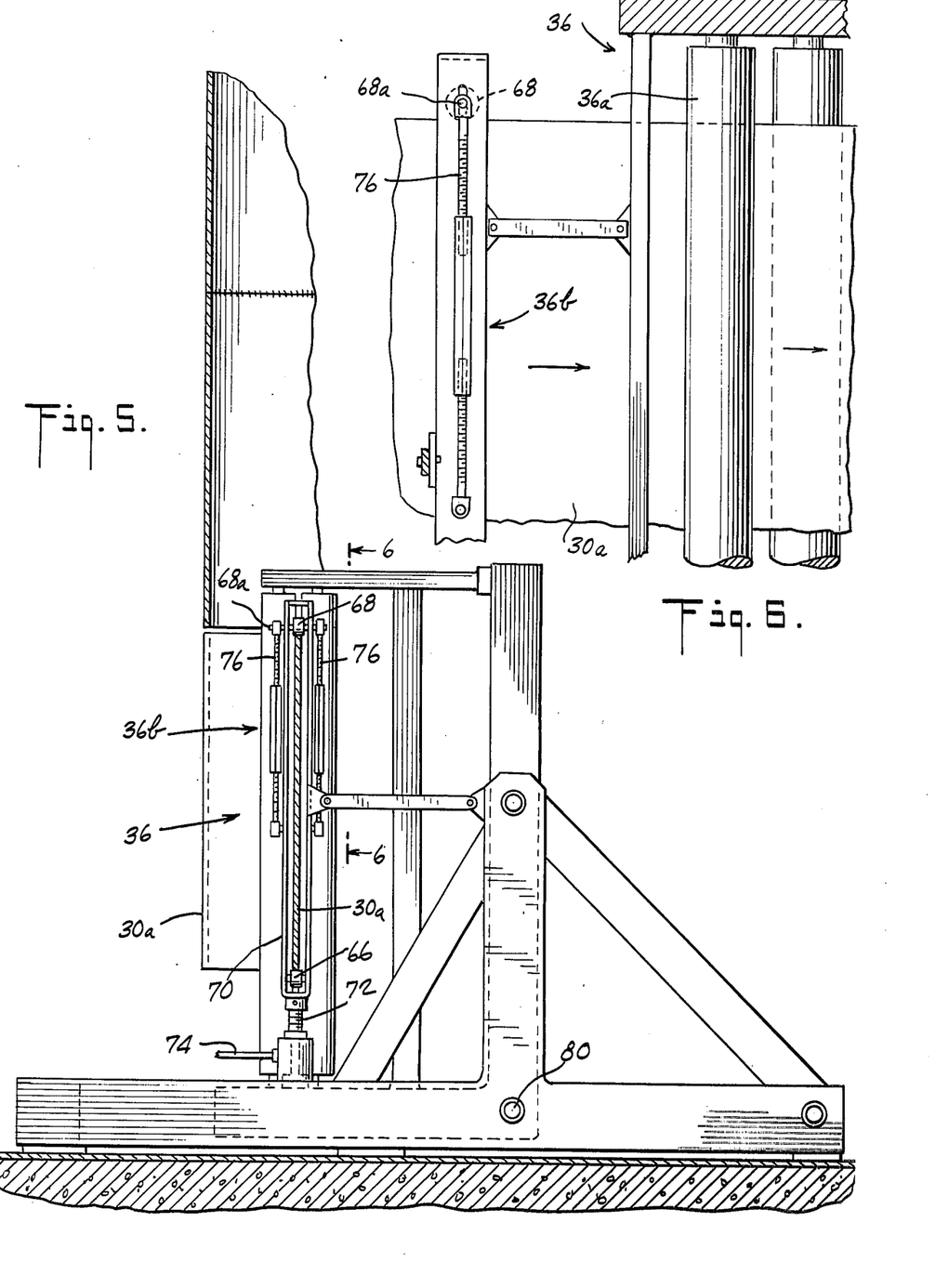

Referring to FIGS. 4 to 6, the station 36 for bending the strip metal is shown. As noted above in the description of FIG. 1, the station 36 receives the strip metal from the coil 30. The station 36 includes conventional bending rollers 36a for appropriately bending the strip to provide it with either no curvature or a predetermined degree of curvature to aid in the construction of the tank. Bending station 36 includes vertical adjustment assemblies 36b located at the input and output sections of the bending station 36, as shown in FIG. 4. With reference also to FIGS. 5 and 6, the vertical adjustment assemblies 36b comprise rollers 66 and 68 respectively at the bottom and top of the metal strip 30a. The bottom roller 66 is carried in a yoke 70 supported by a threaded rod 72 to provide for vertical adjustment of the threaded rod and hence vertical positioning of the lower roller 66. The lower roller 66 is positioned against and supports the lower edge of the strip 30a. Alternatively, the support structure for the rod 72 may comprise a hydraulic jack receiving hydraulic fluid from an input line 74 suitably controlled to raise and lower the rod 72 and hence the support rollers 66.

The upper support roller 68 pivots about a shaft 68a which is supported at its ends by turnbuckle rods 76. These turnbuckle rods form a part of turnbuckle assemblies that are secured to the yoke 70. By suitable adjustment of these turn-buckle assemblies, the upper roller support shaft 68a is raised or lowered. In many applications, it may not be necessary to include the upper roller 68, the lower roller 66 sufficing. As it is desired to raise and lower the strip 30a, the lower roller 66 is raised or lowered. As that roller is lowered, the weight of the metal strip causes that strip to rest against the roller and to follow its upward and downward movement. If downward movement of the roller 66 does not produce the corresponding downward movement of the strip 30a, the upper roller 68 will produce such a downward movement of the strip as the upper roller is lowered along with the lower roller 66 by bearing downwardly against the upper edge of the strip 30a. The bending roller assembly 36 is pivotally mounted about a pivot axis 80 so that it may be pivotted from the operating position (shown in FIG. 5) 90° to a non-operating position in which the assembly does not extend as high in the vertical direction as it does in the operating position. This facilitates in moving the bending roller assembly 36 away from the construction site upon the completion of a tank building operation.

Figures 7, 8:
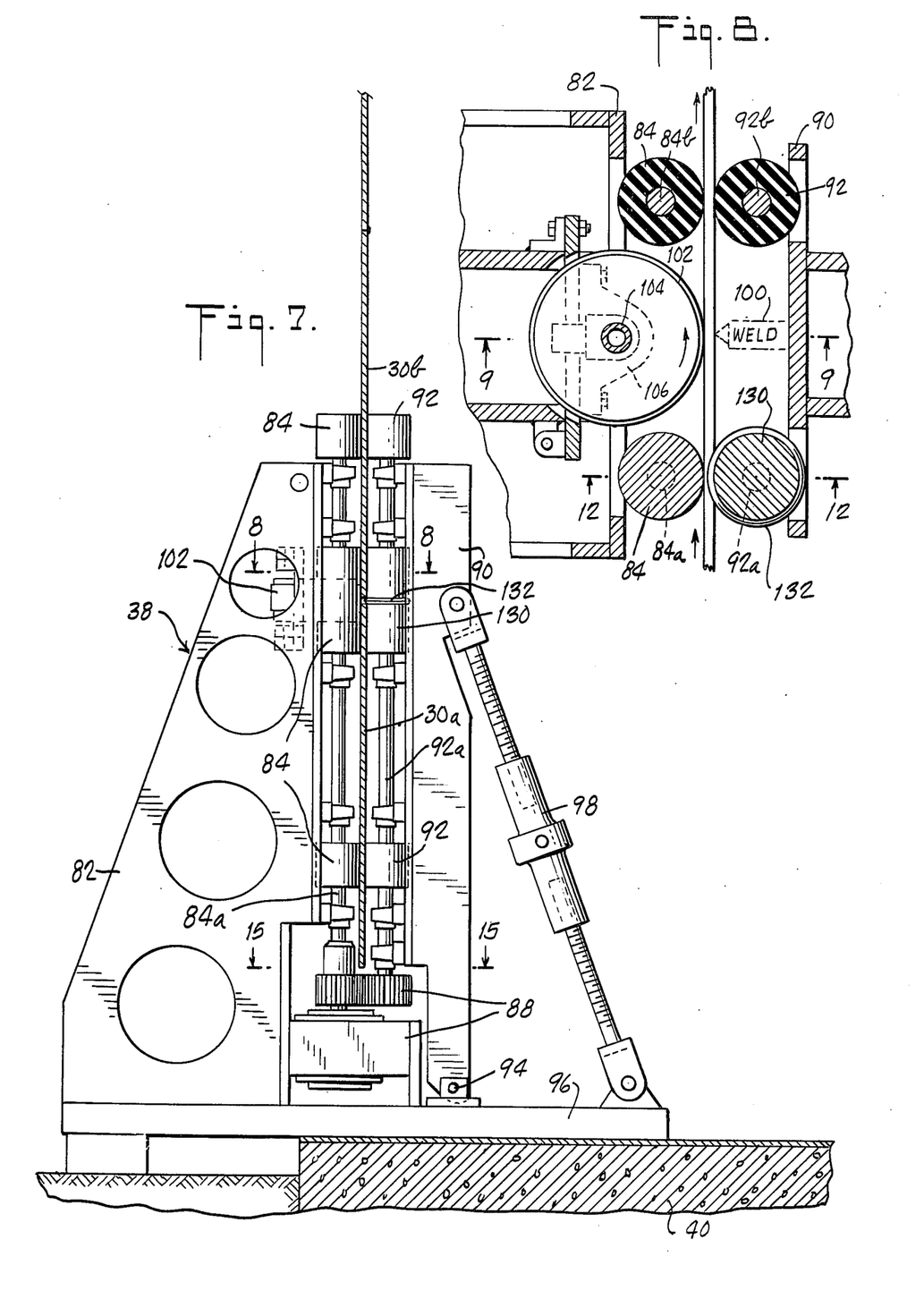
FIG. 7 is a side view of another part of the facility shown in FIG. 1.
FIGS. 8 and 9 are sectional views, to enlarged scales, taken respectively along sections 8—8 and 9—9 respectively in FIGS. 7 and 8.

FIG. 7 shows in detail the assembly 38 of FIG. 1. This assembly essentially constitutes a plate alignment, plate welding, and plate driving station. The assembly 38 includes a first part 82 that carries rollers 84 thereon.

Figures 14, 15:
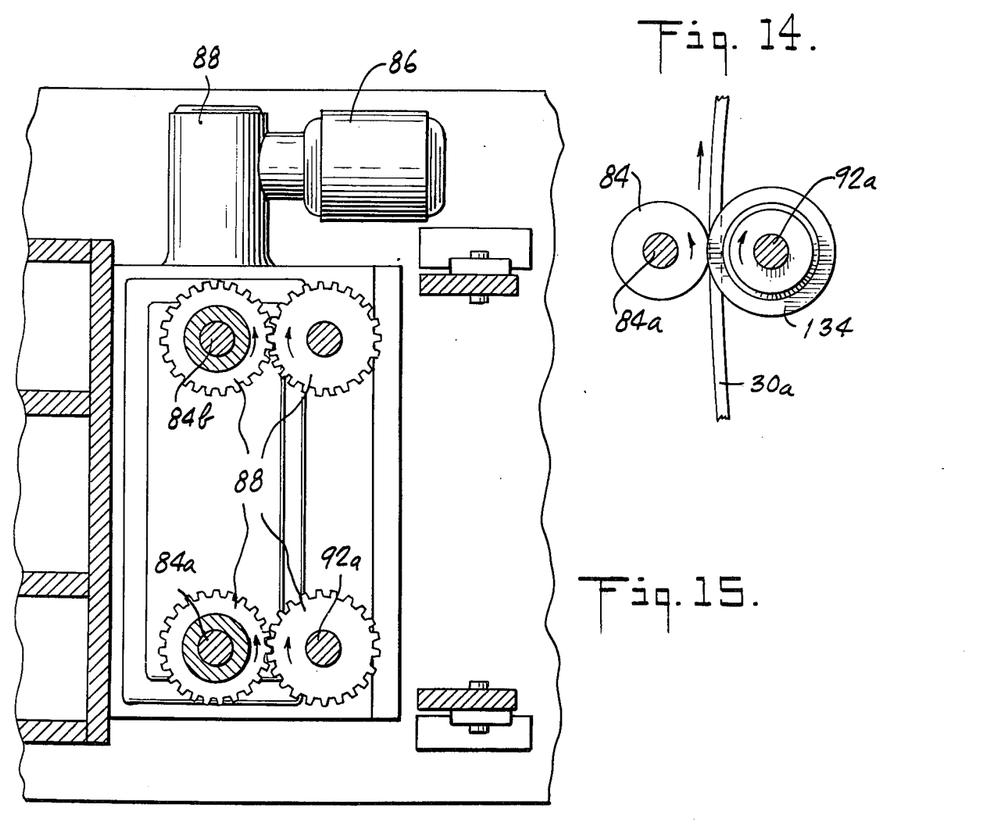
FIG. 14 is a sectional view taken along the section 14—14 in FIG. 13.
FIG. 15 is a sectional view, to an enlarged scale, of part of the apparatus shown in FIG. 7.

There are a total of eight of such rollers 84, although this number is representative, mounted upon shafts 84a and 84b. These shafts are driven by a motor 86 and gearing 88 (See FIG. 15). The lower ones of the rollers 84 bear against the outside surface of the metal strip 30a that is fed to and passes through the assembly 38, while the upper ones of the rollers 84 bear against the outside surface of the strip 30b constituting the helical turn immediately above the strip 30a. Similarly, the assembly 38 includes a second part 90 which carries rollers 92 mounted upon shafts 92a and 92b. These shafts are also driven by the motor 86 and gearing 88 (See FIG. 15). The part 90 of the assembly 38 is pivotally mounted about an axis 94 attached to support surface 96. This allows the part 90 of the assembly 38 to be collapsed, i.e., pivoted about the axis 94 from the operating position shown in FIG. 7 to a non operating position oriented about 90° from the operating position. This facilitates in removal of the entire assembly 38 following the completion of construction of a tank, at which time the assembly 38 may be withdrawn from beneath the metal strip 30a. A turnbuckle assembly 98 is employed to hold the part 90 in an operating position. Adjustment of the turnbuckle assembly is achieved to vary the force with which the rollers 92 bear against the strips 30a and 30b.

The welding of the upper edge of the strip 30a fed to the support assembly with the lower edge of the helical turn 30b immediately thereabove is achieved advantageously by an automatic welding head 100 shown in FIG. 8. The spacing apart of the lower edge of the strip 30b from the upper edge of the strip 30a may be achieved by simple adjustment of the roller control mechanisms 36b forming a height adjustment mechanism as part of the bending assembly 36 described above in connection with FIGS. 4 to 6. Alternatively, spacing devices may be employed as described in connection with FIGS. 12 and 13.

Figure 9:
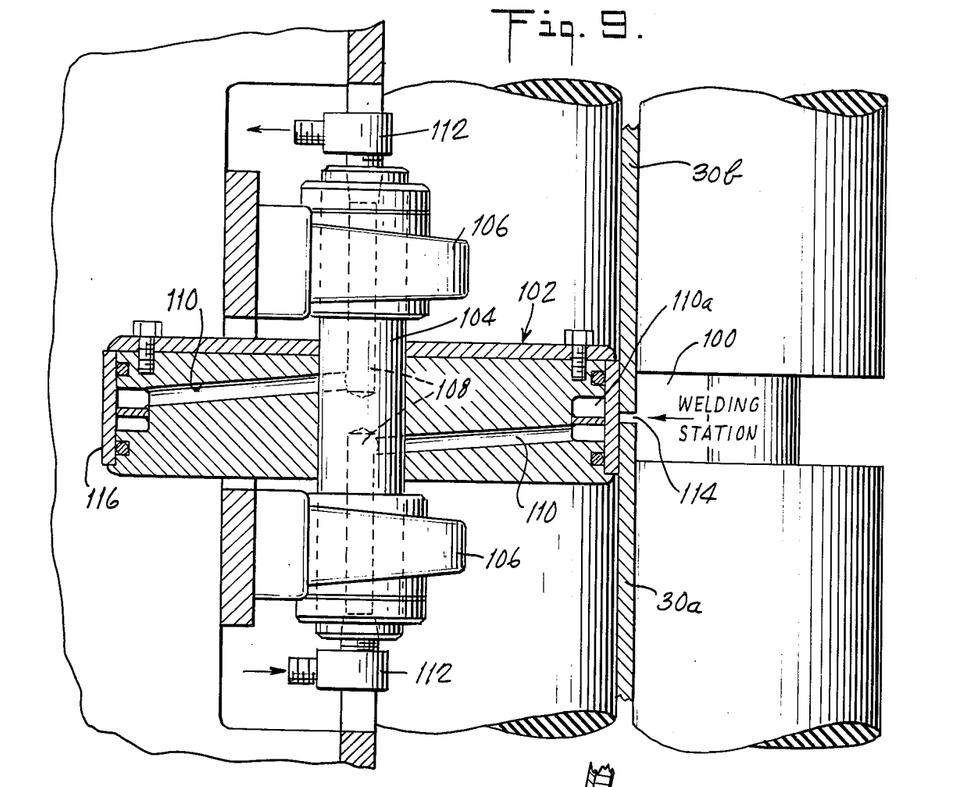

In connection with the welding together of the strips 30a and 30b, a chill roll 102 may be employed as shown in FIGS. 8 and 9. The chill roll 102 is mounted to a shaft 104 which in turn is carried by and free to rotate within bearing assemblies 106. The shaft contains fluid passages 108 therein which communicate with fluid passages 110 within the chill roll for the passage of a coolant through the chill roll. Coolant is circulated through the chill roll 102 via conventional slip coupling devices 112. The chill roll 102 is free to rotate as the strips 30a and 30b move past the welding station 100 (the chill roll bears against the strips). Coolant flowing within the passages 110, and particularly in peripheral passage 110a, cools the peripheral surface of the chill roll adjacent gap 114 between the strips 30a and 30b where the weld bead is formed.

Figure 10:
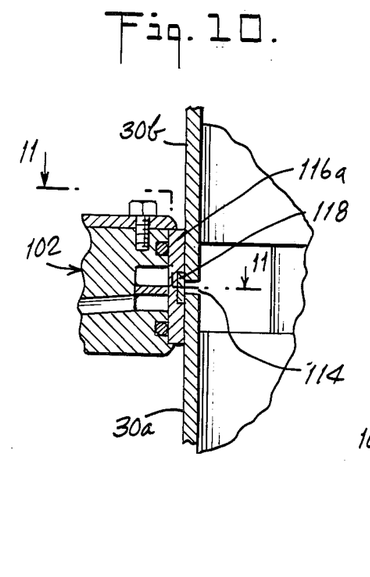
FIG. 10 is a fragmentary sectional view of an alternative form of chill roller useful in the welding of strip metal, similar to the roller shown in FIG. 9.
Figure 11:
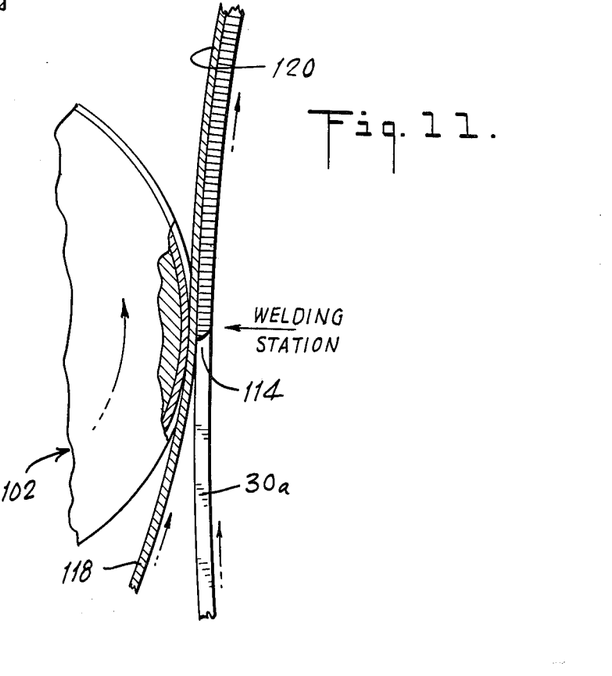
FIG. 11 is a sectional view taken along the section 11—11 in FIG. 10.

The peripheral surface of the chill roll 102 may take the form of a band 116 of metal, as shown in FIG. 9. That band simply serves as a back-up plate closing off the gap 114. Alternatively, as shown in FIG. 10, band 116a is slightly different, and includes a groove 118 in the periphery thereof adjacent the gap 114. A back-up strip 120, as shown in FIG. 11, may be fed into the groove 118 which is welded to the plates or strips 30a and 30b. Alternatively, the back-up strip 120 may be omitted, while the groove 118 may be retained in the periphery of the chill roll. In this case, the groove serves to shape a bead of metal on the outside surface of the tank under construction.

Figure 12:
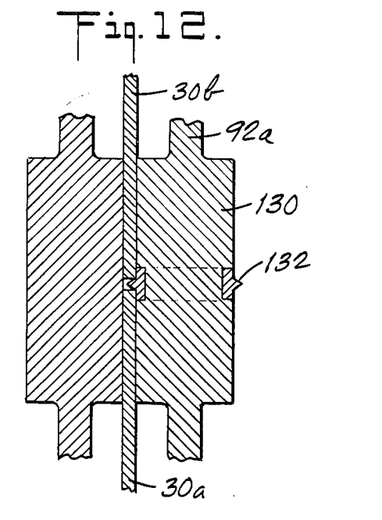
FIGS. 12 and 13 are sectional views of alternative forms of strip spacing devices useful in the facility shown in FIG. 1.
Figure 13:
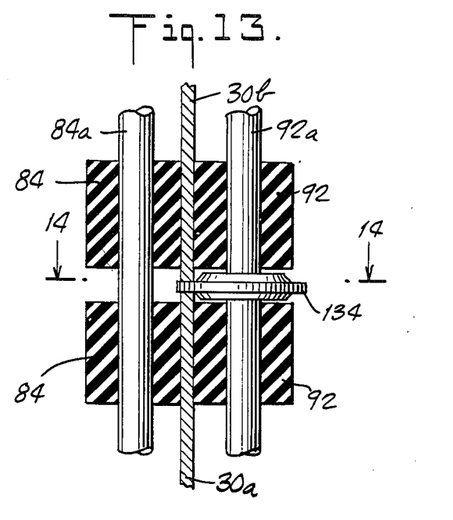

FIGS. 12 and 13 show spacing devices useful in maintaining the appropriate spacing between the plates or strips 30a and 30b. As shown in FIG. 12, the spacing device may take the form of a roller 130 mounted for rotation with shaft 92a. The roller includes a wedge shaped peripheral portion 132 positioned between the strips 30a and 30b, maintaining an appropriate space relationship for proper welding. FIG. 8 shows the roller 130 positioned just ahead of the welding head 100.

In FIG. 13, an alternative arrangement is shown. In this case, a disk 134 is included which is free to rotate about and move along shaft 92a. The peripheral edge of the disk is positioned between the strips 30a and 30b to maintain them in appropriate space relationship for proper welding. (See also FIG. 14)

Figure 16:
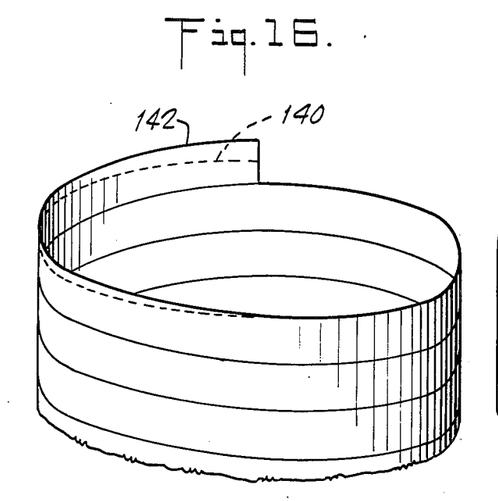
FIGS. 16 and 17 are perspective views of the top section of an open-ended tank, showing how that section may be cut and welded to fabricate a horizontal base for the support of a dome-shaped top as shown in FIG. 18.
Figure 17:
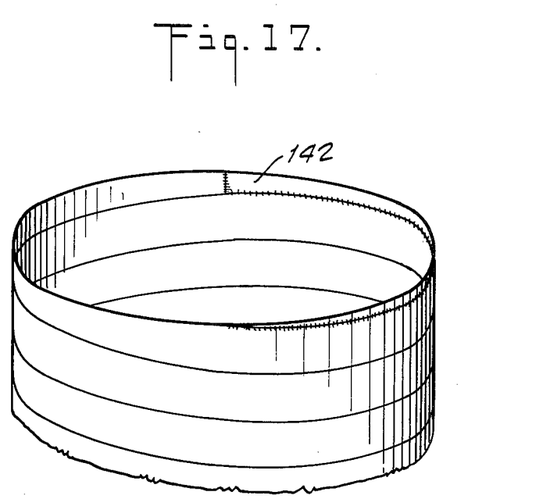
Figure 18:
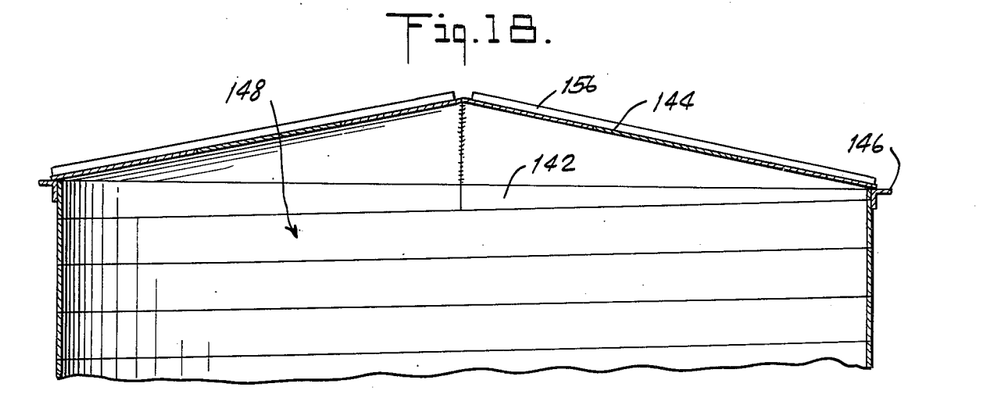

At the end of the construction of a tank, an open-ended cylinder will be produced having a top and bottom which appears as shown in FIG. 16 (with respect to the top only). Because a helically wound strip of metal is employed in the building of a tank, the top and bottom sections will be non-level, as shown in FIG. 16. In order to produce level top and bottom edges, the top (and bottom) may be cut as shown by dashed line 140 in FIG. 16. In other words, a triangular-shaped piece 142 is cut from the end of the strip forming the tank of a length approximately equal to one-half the circumference of the tank. That triangular-shaped piece 142 is secured to the remaining half-circumference of the tank, as shown in FIG. 17, to create a horizontal edge for the securing of a top assembly such as shown in FIG. 18 to the tank. The same procedure, as noted, may be employed for the bottom of the tank.

Figure 19:
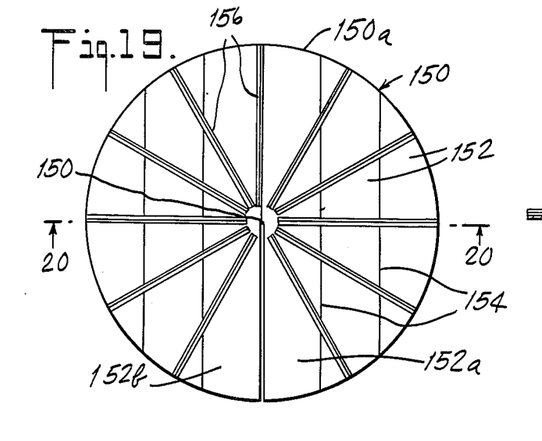
FIGS. 19 and 20 illustrate the formation of a dome-shaped top from a flat section of sheet metal.
Figure 20:
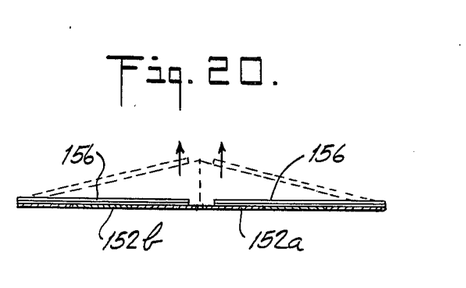

In FIG. 18 top assembly 144 is shown, which may be secured (for example, by welding) to L-shaped bracket 146 in turn secured to the top edge of tank 148. The top assembly may be advantageously produced as shown in FIGS. 19 and 20. In particular, the top assembly is formed from essentially a flat sheet metal section suitable for the forming of a dome-shaped top. A substantially circular section 150 is shown in FIG. 19. Preferably, the section is formed from strips 152 of sheet metal of uniform width that are joined together along parallel joining lines 154 (the edges of the strips) and then cut to form a substantially circular flat section of sheet metal. One pair of adjacent strips 152a and 152b are not joined together along the edges thereof. In particular, they are not joined together along a radius of the substantially circular section of sheet metal extending from the outer edge 150a to the center 150b. Additionally, to strengthen the top assembly, radial reinforcing members 156 are joined to the strips, as shown in FIG. 19.

When it is desired to assemble the top section onto a completed tank, that section is lifted as shown in FIG. 20 to form a dome-shaped top. It will be understood that, upon such lifting, a slight overlap will result along adjacent edge portions of sections 152a and 152b. These may be cut away in assembling the top onto the L-shaped flange 146 as shown in FIG. 18.

Figure 22:
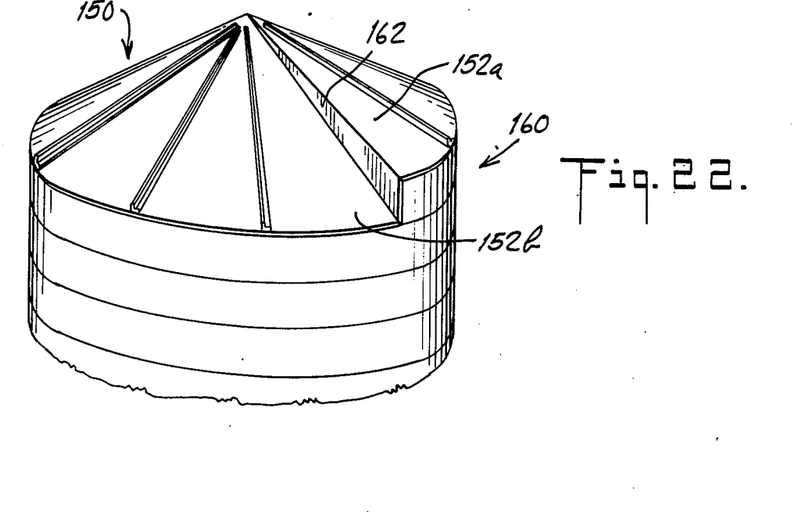
FIG. 22 is a perspective view of a completed tank top joined to a base of the type shown in FIG. 16.

Alternatively, a top section as shown in FIG. 19 may be placed upon the top portion of an open-ended tank as shown in FIG. 22, in which the top portion is not cut away as was indicated in FIG. 16 and rejoined in FIG. 17 to produce a level top section for the joinder of the domed top to the tank. In FIG. 22, tank 160 is shown to which domed top 150 is applied. A separate triangular piece 162 is positioned as shown to fill in the space between the top sections 152a and 152b created since the edges of these sections are not immediately adjacent each other (because of the different inclinations to the horizontal of these sections). The triangular section 162 may be welded or otherwise suitably joined to the sections 152a and 152b.

The advantage of the top construction shown in FIG. 22 is that there need be no cutting as necessary with the construction of FIGS. 16 to 18. A completely level top edge of the tank, however, is obviously not produced. The advantage of the cutting arrangement of FIG. 16, is that it involves only a semi-circular cut. In large diameter storage tanks, it is difficult to handle full circumference cuts as proposed in the McDonald patent cited above. Furthermore, since the cut section is joined to an immediately adjacent section, different types of metal may be employed in the construction of the tank without problem. To explain, thinner gauge metal may be used at the top of a tank and thicker gauge metal at the bottom. With a semi-circular cut as shown in FIG. 16, all the cut metal is utilized in the formation of the top (or bottom) construction. In the case of a full circular cut as in the McDonald patent, a full circular piece of scrap is left over which may not be used in the same tank in the event that different types of metal are used, as noted above.

As noted, the procedures described above are applicable particularly to the construction of large diameter storage tanks. A typical size is thirty-one feet in diameter, with a circumference of about ninety-eight feet. Sheet steel approximately one quarter inch thick and four feet in width may be employed, in coils of 60,000 to 70,000 pounds (i.e., 1500 to 1600 lineal feet of steel per coil). As a coil of steel is exhausted in the building of a tank, another coil is employed, with the end joined by welding to the previous coil. The movement of the steel in the fabrication of a tank may be at any convenient rate. With automatic welding, five feet to ten feet per minute may be achieved. As noted, hand welding may also be employed, in which case slower rates of strip feed may be used.

After a full tank has been completed (of the appropriate height), a bottom section may be welded on by removing the support roller assemblies 42 one by one. A triangular section of the type shown in FIG. 16 may be employed to produce a flat bottom construction. Additionally, a flat bottom may be produced by cutting the entire bottom, and not rewelding a piece such as designated 142 in FIG. 17. Besides individually removing support roller assemblies 42, the entire tank may be lifted from those assemblies, by a crane, and moved to another location upon which it is set upon an appropriate base. These latter two procedures are the invention of another person.

it should be apparent that modifications may be made to the representative embodiments and procedures described above, although such embodiments and procedures are presently preferred. For example, welding of the strips has only been shown on one side of the tank surface. Welding on both sides could be employed, if desired. Various forms of chill rolls have been shown. All features could be included in a single chill roll, for example, movable vertically to provide a backup groove or no back-up groove, as desired. The tank support assemblies 42 shown in FIG. 1, instead of individual assemblies, may be a single essentially continuous assembly. Various driving arrangements for driving the strip metal may be employed besides the roller drive mechanisms described.

Accordingly, the invention should be taken to be defined by the following claims.

What is claimed is:

1. Apparatus for producing a large diameter storage tank from strip metal, comprising a support assembly arranged circularly on a base for supporting strip metal vertically in a helical path, means for feeding strip metal to said support assembly without edge bending the strip at any time during production, means for aligning in a vertical plane the upper edge of the strip fed to the support assembly below the lower edge of the helical turn immediately thereabove, and means for butt welding the two vertically aligned edges, in which said strip feeding means includes means for vertically adjusting the position of said strip both upwardly and downwardly in a vertical plane, in which said vertical adjusting means includes an upper roller means mounted against the upper edge of said strip and which has a downward force applied thereto to lower said strip.

2. Apparatus for producing a large diameter storage tank from strip metal, comprising a support assembly arranged circularly on a base for supporting strip metal vertically in a helical path, means for feeding strip metal to said support assembly, means for aligning the upper edge of the strip fed to the support assembly below the lower edge of the helical turn immediately thereabove, and means for butt welding together the two vertically aligned edges, in which said aligning means includes support rollers bearing against opposite sides of said strip fed to said support assembly and said helical turn immediately thereabove, in which said aligning means includes a support structure mounted on said base and including a first part carrying those rollers bearing against the outside surfaces of said strip and said helical turn, and a second part carrying those rollers bearing against the inside surfaces of said strip and said helical turn, said second part being pivotally mounted on said support structure for movement between an operating position in which said rollers bear against said inside surfaces and a non-operating position oriented about 90° from said operating position to facilitate in moving said support structure away from said tank at the completion of the building thereof.

3. Apparatus for producing a large diameter storage tank from strip metal, comprising a support assembly arranged circularly on a base for supporting strip metal vertically in a helical path, means for feeding strip metal to said support assembly, means for aligning the upper edge of the strip fed to the support assembly below the lower edge of the helical turn immediately thereabove, and means for butt welding together the two aligned edges, in which said welding means comprises a fluid-cooled roller bearing against the sides of said strip fed to said support assembly and said helical turn immediately thereabove and adjacent to said aligned edges, and a welding mechanism on the opposite side of said strip and turn for completing said butt welding of said edges, in which said fluid-cooled roller includes a groove in the surface thereof adjacent said aligned edges, including a back-up strip, and means for feeding said back-up strip into said groove.

4. Apparatus for producing a large diameter storage tank from strip metal, comprising a support assembly arranged circularly on a base for supporting strip metal vertically in a helical path, means for feeding strip metal to said support assembly, means for aligning the upper edge of the strip fed to the support assembly with the lower edge of the helical turn immediately thereabove so that said edges are spaced apart in a vertical plane from each other, and means for butt welding together the two spaced apart edges, in which said support assembly comprises groups of rollers arranged circularly on said base, each group comprising a plurality of support rollers supporting the lower edge of said strip, and a plurality of side support rollers positioned against the inside and outside surfaces of said strip, in which at least some of said support rollers are mounted on a support bracket which is pivotable about horizontal and vertical axes to provide for varying degrees of orientation of said rollers.

5. Apparatus according to claim 4 including means coupling said support bracket to said base for stabilization of said bracket.

6. Apparatus for producing a large diameter storage tank from strip metal, comprising a support assembly arranged circularly on a base for supporting strip metal vertically in a helical path, means for feeding strip metal to said support assembly, means for aligning the upper edge portion of the strip fed to the support assembly with the lower edge portion of the helical turn immediately thereabove so that said edge portions may be joined together, said support assembly comprising groups of rollers arranged circularly on said base, each group comprising a plurality of support rollers supporting the lower edge of said strip, and a plurality of side support rollers positioned against the inside and outside surfaces of said strip, at least some of said support rollers being mounted on a support bracket which is pivotable about horizontal and vertical axes to provide for varying degrees of orientation of said rollers.

7. Apparatus according to claim 6 including means coupling said support bracket to said base for stabilization of said bracket.

* * * * *